No. 818,451. PATENTED APR. 24, 1906.
H. R. INGLEDUE.
HAY RAKE.
APPLICATION FILED JUNE 26, 1905.
2 SHEETS—SHEET 1.
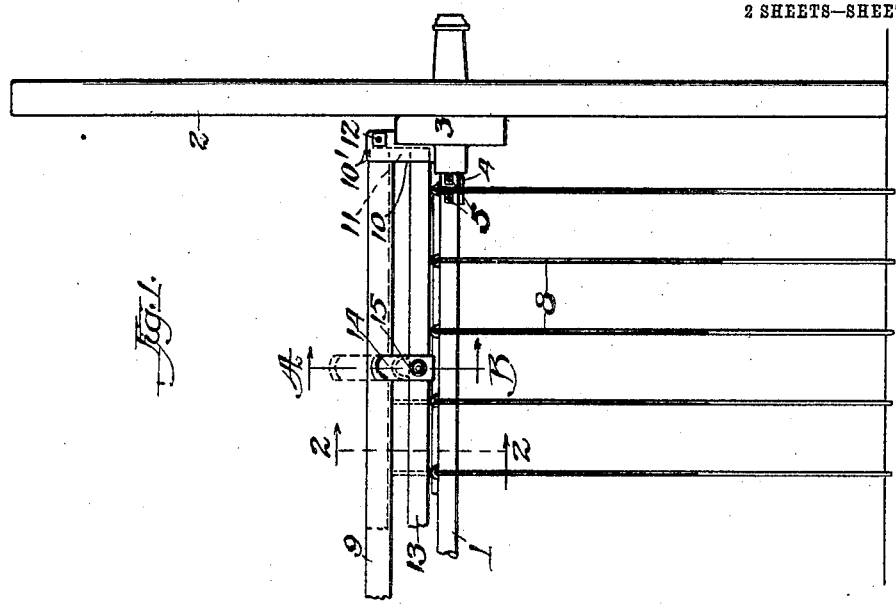
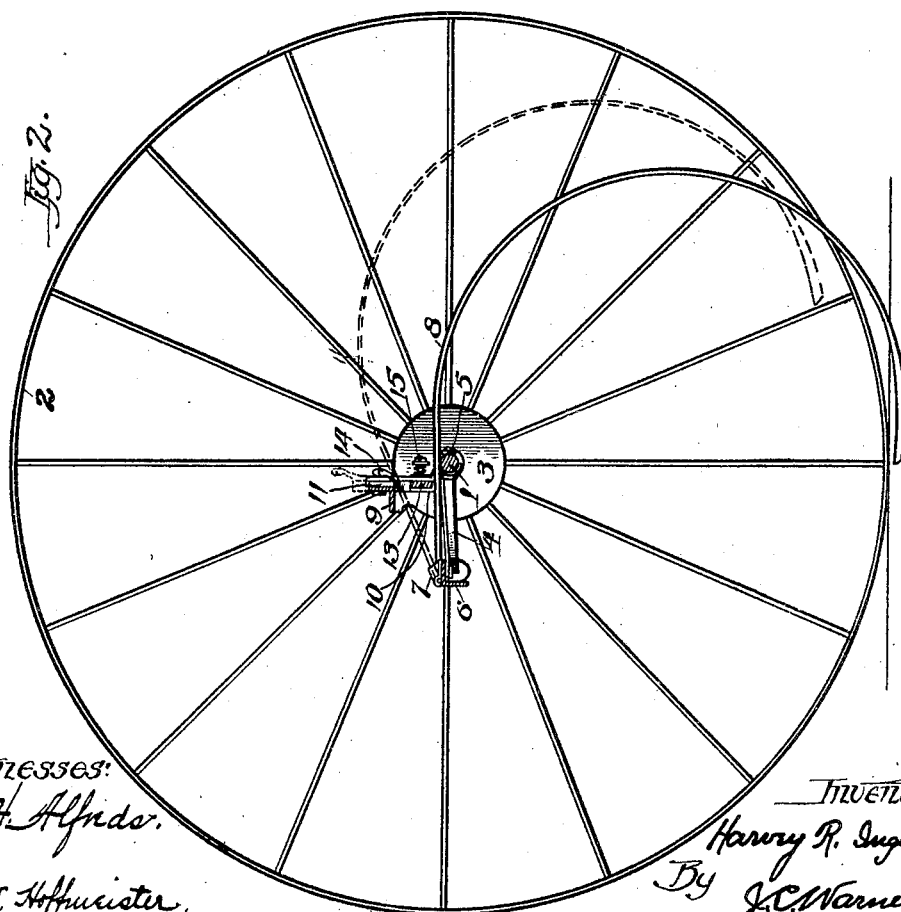

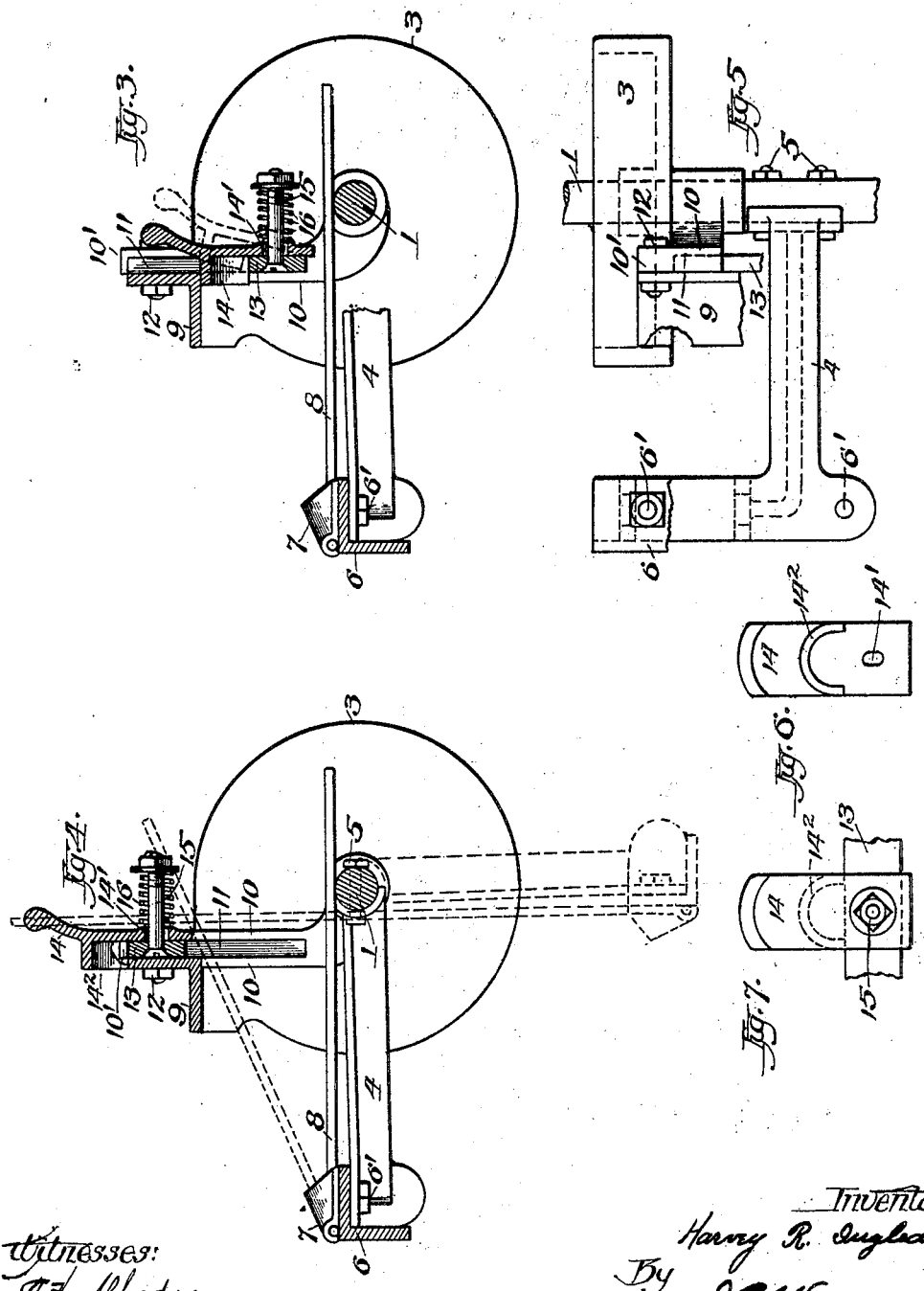

UNITED STATES PATENT OFFICE.

HARVEY R. INGLEDUE, OF CHICAGO, ILLINOIS.

HAY-RAKE.

No. 818,451.  Specification of Letters Patent.  Patented April 24, 1906.

Application filed June 26, 1905. Serial No. 267,079.

*To all whom it may concern:*

Be it known that I, HARVEY R. INGLEDUE, a citizen of the United States, residing at Chicago, in the county of Cook and State of Illinois, have invented a new and useful Improvement in Hay-Rakes, of which the following is a complete specification.

The present invention relates to the class of hay-rakes which are provided with floating teeth as distinguished from rigidly-fastened teeth, the object being to provide means for converting at the will of the operator the floating teeth into rigidly-fastened teeth, or vice versa.

It is evident that in the operation of the rake under normal conditions and on level ground teeth secured rigidly to the rake-head could be used without difficulty, but when using the rake on rough, uneven, or stumpy ground it is often desirable to employ floating rake-teeth, any one of which is thus free to fall into depressions or to be raised over obstructions independent of the other teeth on the rake-head.

The preferred construction embodying my invention is disclosed in the accompanying drawings, in which—

Figure 1 represents a rear elevation of the right-hand side of a rake. Fig. 2 is a longitudinal section of the machine, taken as indicated by the line 2 2 in Fig. 1. Figs. 3 and 4 are longitudinal sections of the rake-head, showing the rake-head castings in inside elevation. The sections are taken on the line A B of Fig. 1 or through the latch which locks the vertically-adjustable bar in its upper or lower position. Fig. 3 shows the bar and latch in the lower or operative position, while Fig. 4 shows the same in its upper or inoperative position. Fig. 5 represents a plan view of one of the rake-head castings and parts adjacent thereto; and Figs. 6 and 7 show a front and rear view, respectively, of the latch for locking the tooth-controlling bar.

Referring to the several figures, 1 designates the rake-axle, 2 one of the rake-supporting wheels journaled thereon, and 3 one of the main-frame castings sleeved loosely upon and near the ends of said axle and adjacent to said supporting-wheels. A forwardly-projecting arm 4 is secured rigidly to the axle 1 and near each end thereof by means of the bolts 5. As the arms 4 and main-frame castings 3 at both ends of the axle are exact duplicates of each other, (barring the fact that they are of course made "right and left,") one side only, the right-hand side, is disclosed in the drawings. On the ends of these forwardly-projecting arms is supported the rake-tooth bar 6, which consists, preferably, of an angle-iron, as shown, and its securement is effected by means of the bolts 6'. On the upper surface of this bar is bolted a series of rake-tooth clips 7, which form pivotal bearings for the rake-teeth 8. The axes of these pivotal bearings extend horizontally and are transversely coincident, so that the rake-teeth have independent vertical movements about the pivotal axes formed by said clips. The said rake-teeth extend rearwardly from their pivotal axes, resting upon the axle 1, from which position, as shown in Fig. 4, they are free to rise to the dotted-line position shown in the same figure. The point of the tooth 8 when in the lowest possible position is directly beneath the axle and perhaps two inches below the bottom of the supporting-wheels 2. This construction will enable the teeth to drop into slight depressions or permit them to yield upwardly on meeting an obstruction, while the fact that the teeth are pivoted forward of the axle will operate to balance the rake-head about its axis of movement and bring the line of contact of the teeth with the ground substantially below the axle.

The main-frame casting 3 is represented as a flanged circular plate; but its particular form in so far as it affects this invention is immaterial. The upper surface of this plate is provided with a flattened portion, as shown, the flattened portion receiving the end of the main-frame member 9, which rigidly connects the casting 3 with the corresponding one on the other side of the rake. The said castings 3 are provided on their inner surfaces or the surface opposite from the rake-wheels with the projecting guides or flanges 10, forming between them the vertically-extending groove 11, the outer portion of said flange terminating on the periphery of the casting in the lug 10'. (See Fig. 5.) To this lug is secured the end of the main-frame member 9 by means of the bolt 12, the rear side of said member forming the forward wall of that portion of the groove which lies outside of the periphery of the casting 3, as clearly shown in Figs. 3 and 4. The guides or flanges 10 are formed, preferably, integral with the casting 3 and are so disposed with respect to the axle 1 that the groove 11 will be slightly in advance thereof. Within the said groove fits the end of the rake-tooth-controlling bar 13, the opposite end being similarly arranged.

The controlling-bar, which constitutes the chief element of this invention, operates to lock the rake-teeth against movement on their pivotal axes and independent of the rake-head. This bar can be moved up and down between its guides 10, and when it is made to occupy its lower position, as the position shown in Fig. 3, any substantial independent movement of the rake-teeth with respect to the rake-head will be prevented, or the teeth may be regarded as locked. This, in effect, destroys the floating effect of the teeth and renders them rigid on the rake-head, as may be desired, when the rake is employed on a comparatively even surface. When the bar 13 occupies the position indicated in Fig. 4 or an inoperative position, the teeth will be free to rise and fall within the prescribed limits. To secure it in its upper or lower position, as desired, the spring-held latch 14 is secured thereto. The preferred form of this latch is shown in detail in Figs. 6 and 7. The lower end of the latch is provided with an elongated aperture 14′, in which is received the bolt 15, this bolt securing the latch to the bar, where it is yieldingly held by means of the spring 16. A forwardly-projecting semicircular lug $14^2$ bears on the under side of the main-frame member 9 to hold the bar 13 in its tooth-locking position and against the upper side of the same member when the said bar is held in its inoperative position, as set forth in Figs. 3 and 4, respectively. The desirability of placing the tooth locking or controlling bar 13 slightly in advance of the axle 1 is apparent from an inspection of Fig. 4, in which the vertically-extending dotted lines indicate the position of the rake head and teeth when in dumping position, and sufficient space must be left to permit of the teeth extending vertical and yet lie in front of the axle and in the rear of the bar.

Since the essence of the invention resides in placing adjustable means in a position in which it can be made at the will of the operator to effectively prevent or limit the movement of a series of floating rake-teeth, it is obvious that it is susceptible to many variations in form and structure without departing from the spirit thereof.

What I claim as my invention, and desire to secure by Letters Patent, is—

1. In a hay-rake, in combination, an axle, main-frame castings sleeved on the ends thereof and a main-frame member interposed therebetween, vertically-extending guides formed upon said castings, arms rigidly secured to said axle and extending forwardly therefrom, a rake-head bar supported upon the forward ends thereof, rake-teeth pivotally mounted upon said bar, said rake-teeth having an independent vertical movement about their pivotal axes, a vertically-adjustable tooth-controlling bar movably arranged within said guides and above said rake-teeth for securing the latter against such independent vertical movement, and means for locking said bar in the desired position.

2. In a hay-rake, in combination, an axle, an oscillating rake-head consisting of forwardly-projecting arms secured to said axle and a rake-head bar supported upon the ends thereof, main-frame castings sleeved upon and near the ends of said axle and a main-frame member interposed therebetween, rake-teeth pivotally mounted upon said rake-head bar, said rake-teeth having an independent vertical movement about their pivotal axes, vertically-extending guides formed upon said main-frame castings, a vertically-adjustable tooth-controlling bar movably arranged within said guides above the rake-teeth and slightly in the rear of the axle for securing the said teeth against independent vertical movement, and a spring-held latch for locking said tooth-controlling bar in the desired position.

HARVEY R. INGLEDUE.

Witnesses:
 IVAN L. SMITH,
 JOHN N. STIENBARGER.